United States Patent
Enslow et al.

(10) Patent No.: US 11,801,645 B2
(45) Date of Patent: Oct. 31, 2023

(54) SYSTEM AND METHOD FOR DETERMINING A BUILD PLAN BASED UPON AN ANALYZED BUILD PLATE GEOMETRIC SIGNATURE

(71) Applicant: 3D Systems, Inc., Rock Hill, SC (US)

(72) Inventors: Andrew Enslow, Escondido, CA (US); Nickalaus Podgursky, Cornelius, NC (US); Daniel Alonzo, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 106 days.

(21) Appl. No.: 17/391,459

(22) Filed: Aug. 2, 2021

(65) Prior Publication Data

US 2021/0362433 A1 Nov. 25, 2021

Related U.S. Application Data

(63) Continuation-in-part of application No. 17/228,876, filed on Apr. 13, 2021.

(60) Provisional application No. 63/060,396, filed on Aug. 3, 2020, provisional application No. 63/011,073, filed on Apr. 16, 2020.

(51) Int. Cl.
*B29C 64/393* (2017.01)
*B29C 64/124* (2017.01)
*B33Y 50/02* (2015.01)
*B33Y 10/00* (2015.01)
*B33Y 30/00* (2015.01)
*B29C 64/245* (2017.01)

(52) U.S. Cl.
CPC .......... *B29C 64/393* (2017.08); *B29C 64/124* (2017.08); *B29C 64/245* (2017.08); *B33Y 10/00* (2014.12); *B33Y 30/00* (2014.12); *B33Y 50/02* (2014.12)

(58) Field of Classification Search
CPC ... B29C 64/393; B29C 64/124; B29C 64/245; B29C 64/386; B29C 64/40; B33Y 10/00; B33Y 30/00; B33Y 50/02
See application file for complete search history.

(56) References Cited

U.S. PATENT DOCUMENTS

| | | | | |
|---|---|---|---|---|
| 5,174,931 | A | * 12/1992 | Almquist | G05D 9/12 118/712 |
| 2014/0358273 | A1 | * 12/2014 | LaBossiere | B29C 64/118 700/119 |
| 2019/0091934 | A1 | * 3/2019 | Cooper | B29C 64/393 |

\* cited by examiner

*Primary Examiner* — Joseph S Del Sole
*Assistant Examiner* — Xinwen Ye (57) ABSTRACT

A three-dimensional (3D) printing system for manufacturing a three-dimensional article includes a resin vessel for containing a volume of photocurable resin having a resin upper surface, an imaging system configured to define a build plane, a build plate having a build plate upper surface, a build plate positioner, a sensor configured to generate a signal indicative of a fluid-related vertical position of one or more of the resin upper surface and a component of a volume compensator (VC), and a controller. The controller is configured to (1) operate the build plate positioner to vertically translate build plate upper surface, (2) concurrent with operating the build plate positioner, receiving the signal from the sensor, (3) analyze the signal to determine a build plate geometric signature, and (4) determine or suspend a build plan for building the 3D article based upon the determined geometric signature.

18 Claims, 8 Drawing Sheets

SYSTEM AND METHOD FOR DETERMINING A BUILD PLAN BASED UPON AN ANALYZED BUILD PLATE GEOMETRIC SIGNATURE

FIELD OF THE INVENTION

This non-provisional patent application claims priority to U.S. Provisional Application Ser. No. 63/060,396, Entitled "SYSTEM AND METHOD FOR DETERMINING A BUILD PLAN BASED UPON AN ANALYZED BUILD PLATE GEOMETRIC SIGNATURE" by Andrew Enslow et al., filed on Aug. 3, 2020, incorporated herein by reference under the benefit of U.S.C. 119(e). This non-provisional application is also a continuation-in-part of pending U.S. application Ser. No. 17/228,876 which claims priority to U.S. Provisional Application Ser. No. 63/011,073, filed on Apr. 16, 2020 and incorporated herein by reference.

FIELD OF THE INVENTION

The present disclosure concerns an apparatus and method for the digital fabrication of three-dimensional (3D) articles by a layer-by-layer solidification of a build material. More particularly, the present disclosure concerns a way of determining a geometric signature and then using the geometric signature to determine, modify, or suspend a build plan.

BACKGROUND 3D printing systems are in wide use for prototyping and manufacturing articles. One type of 3D printing system utilizes a process called stereolithography. A typical stereolithography system utilizes a resin vessel, an imaging system, and a build plate within liquid resin held by the resin vessel. An article is manufactured in a layer-by-layer manner by selectively imaging and solidifying layers of the resin over the build plate. One challenge is that the build plate may be non-planar and/or not be perfectly parallel to an upper surface of the resin. This can result in a defective or partially missing article if imaging of the article is attempted on a non-parallel surface. Other challenges include determining a vertical position of the build plate to start fabricating layers and to identify situations in which a system is not suitable for a fabrication process without user intervention.

SUMMARY

In a first aspect of the disclosure, a three-dimensional (3D) printing system for manufacturing a three-dimensional (3D) article includes a resin vessel for containing a volume of photocurable resin having a resin upper surface, an imaging system configured to define a build plane, a build plate having a build plate upper surface, a build plate positioner, a sensor that generates a signal indicative of a fluid-related vertical position of one or more of the resin upper surface and a component of a volume compensator (VC), and a controller. The controller is configured to (1) operate the build plate positioner to vertically translate build plate upper surface, (2) concurrent with operating the build plate positioner, receiving the signal from the sensor, (3) analyze the signal to determine a build plate geometric signature, and (4) respond by determining, modifying, and/or suspending a build plan for building the 3D article based upon the determined geometric signature.

This response to a determined geometric signature can have one or more of the following benefits: (A) Assurance that the proper build plate is loaded. (B) Verification that there is no previously fabricated 3D article adhered to the build plate. (C) Reduce time and material required for manufacture of the 3D article.

In one implementation analyzing the signal defines a curve, the curve having a change in slope or inflection point at a first vertical position of the build plate at which a low point of the build plate upper surface is positioned at the resin upper surface, determining the build plan includes starting a selective hardening of resin layers at the first vertical position of the build plate.

In another implementation analyzing the signal defines a curve, the curve having a change in slope or inflection point that defines a height H between a low point and a high point of the build plate upper surface, determining the build plan includes selecting a number N of base layers to fabricate based upon H before fabricating the 3D article. The number N of base layers fabricated before fabrication of the 3D article can be equal to H divided by a thickness t of one base layer plus a predetermined number of additional layers. This has the benefit of reducing time and material by reducing a required number of base layers.

In yet another implementation analyzing the signal defines a curve, the curve is a first or second derivative of a function of fluid-related vertical position versus build plate position, the curve is analyzed to determine a lowest or highest vertical position of the build plate upper surface.

In a further implementation analyzing the signal defines a curve and a verification of whether a correctly sized build plate is installed in the three-dimensional (3D) printing system, the build plan is suspended in the event of a failure to verify that a correctly sized build plate is installed in the three-dimensional (3D) printing system.

In a yet further implementation analyzing the signal defines a curve and a determination of whether a previously fabricated article is present upon the build plate upper surface, the build plan is halted if a previously fabricated article is present upon the build plate upper surface.

DETAILED DESCRIPTION OF THE PREFERRED EMBODIMENTS

Figure 1:
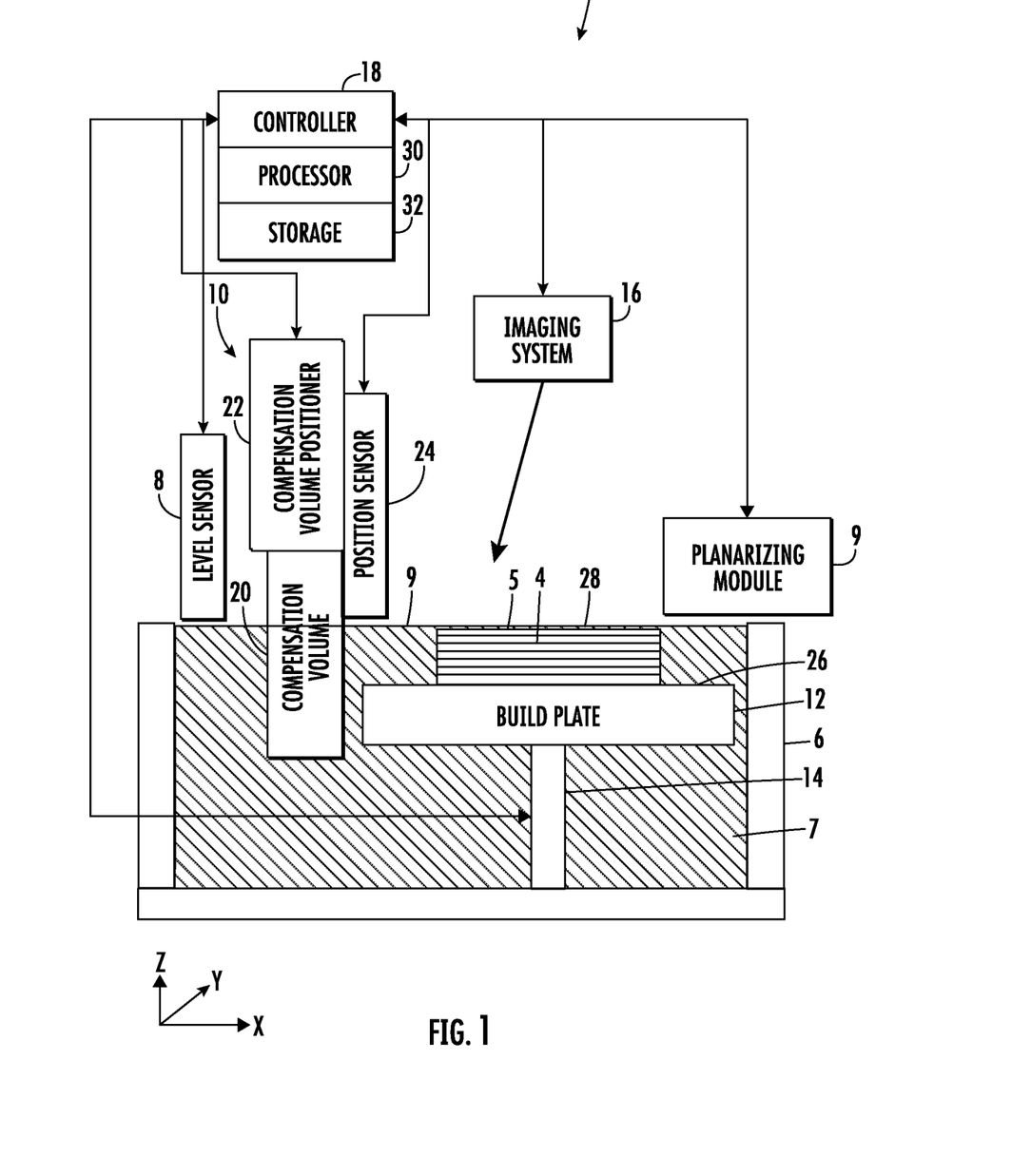
FIG. 1 is a schematic diagram of a three-dimensional (3D) printing system for fabricating a three-dimensional (3D) article in a layer-by-layer manner.

FIG. 1 is a schematic diagram of a three-dimensional printing system 2 for fabricating a three-dimensional article or object 4 in a layer-by-layer manner. Not shown are polymer layers deposited prior to forming article 4. An upper surface of any of these polymer layers prior to formation of another polymer layer is referred to as element 5. In describing system 2, axes X, Y, and Z can be used. Axes X and Y are generally horizontal and axis Z is generally vertical and generally aligned with a gravitational reference. As discussed herein, the term "generally" refers to having a dimension, an angle, or other parameter that is within manufacturing or placement tolerances. For example, "generally equal" means that a design goal is equality but may vary according to manufacturing tolerances and other factors such as a placement location.

System 2 includes a resin vessel 6 containing photocurable resin 7, a resin fluid level sensor 8, a planarizing module 9, a volume compensator (VC) 10, a build plate 12 coupled to a build plate positioner 14, and imaging system 16 some of which are electrically or wirelessly coupled to controller 18. In the illustrated embodiment, the volume compensator (VC) 10 includes a compensation volume (CV) 20, a compensation volume positioner (CVP) 22, and a compensation volume position sensor (CVPS) 24. In an alternative embodiment, a volume compensator (VC) may include a pump or other device for maintaining vertical position of a resin upper surface 9.

The resin fluid level sensor 8 is configured to output a signal or data indicative of a position of the resin upper surface 9. The resin fluid level sensor 8 can sense the vertical position of the resin upper surface 9 position optically, acoustically, or in conventional ways for sensing a position of a resin fluid/air interface.

The VC 10 is configured to maintain the resin upper surface 9 at a specified vertical position within a vertical tolerance range. Ideally the resin upper surface 9 would be coincident with a build plane 28. In the illustrated embodiment, the CV 20 is resides partly within the photocurable resin 7 and extends partly above the resin upper surface 9. The CV 20 can include a metal weight surrounded by an inert polymer shell. The CVP 22 is configured to controllably move the CV 20 up and down to maintain the resin upper surface 9 at the build plane 28 to within the vertical tolerance range. The CVP 20 can include a motorized pulley that raises and lowers a cable that is attached to the VC 20. The CVPS 24 outputs a signal that is indicative of the vertical position of the CV 20.

The build plate 12 has a build plate upper surface 26 for supporting the three-dimensional article 4. The illustrated embodiment depicts the build plate upper surface 26 as being generally parallel with the upper surface of the resin 7 (roughly horizontal). In practice, the upper surface 26 isn't exactly parallel due to mechanical tolerances. The upper surface 26 can have a very large surface area and the lack of parallelism can have substantial implications as will become apparent. The build plate positioner 14 is configured to controllably and vertically position the upper surface 26 (or later, upper surface 5). The planarizing module 9 can be a roller, wiper, or other device for passing across the build plane 28 to assure uniform coatings of resin over the build plate 12.

The build plate 12 can have various shapes and dimensions. In some embodiments the build plate upper surface 26 can have lateral dimensions of 400 millimeters or more. In some embodiments, the lateral dimensions can be 500 millimeters or more, 600 millimeters or more, or 700 millimeters or more. In one illustrative embodiment, the build plate is square and has dimensions of 725 millimeters in X and 725 millimeters in Y. Other build plates can be square, rectangular, circular, oval, polygonal, irregular, or have other shapes.

The imaging system 16 is configured to selectively apply radiation to the build plane 28 above the build plate 12. The application of the radiation to the build plane 28 results in a selective solidification of resin 7 onto a surface above the surface 26. In one embodiment the imaging system 16 includes a laser and scanning mirror system. The build plane 28 ideally coincides with the resin upper surface 9 and an upper surface of a layer of resin that has just been dispensed upon surface 26 or 5. The build plane 28 is defined by a fixed vertical height and effective lateral limits of the imaging system 16 at that fixed vertical height.

The controller 18 includes a processor 30 coupled to an information storage device 32. The information storage device 32 stores software instructions that, when executed by the processor 30, control and/or receive information from resin fluid level sensor 8, the volume compensator 10 (including the compensation volume positioner 22 and the position sensor 24), the build plate positioner 14, the imaging system 16, and other portions of system 2. Thus, the controller 18 is configured to operate (and/or receive information from) various portions of system 2. Controller 18 can be located at a single location in system 2 or be distributed among multiple locations.

To maintain the vertical position of the resin upper surface 9, the controller 18 monitors and analyzes the signal from the fluid level sensor 8 and operates the compensation volume positioner 22 to maintain the vertical position of the resin upper surface 9 to within the vertical tolerance range. The build plane 28 is generally the same as the resin upper surface 9 and a focus of imaging system 16 (however, in some embodiments the imaging system 16 may be slightly defocused at the build plane 28). Thus, it is important to accurately maintain the vertical position of the resin upper surface 9 during process of solidifying layers of photocurable resin 7.

Figure 5:
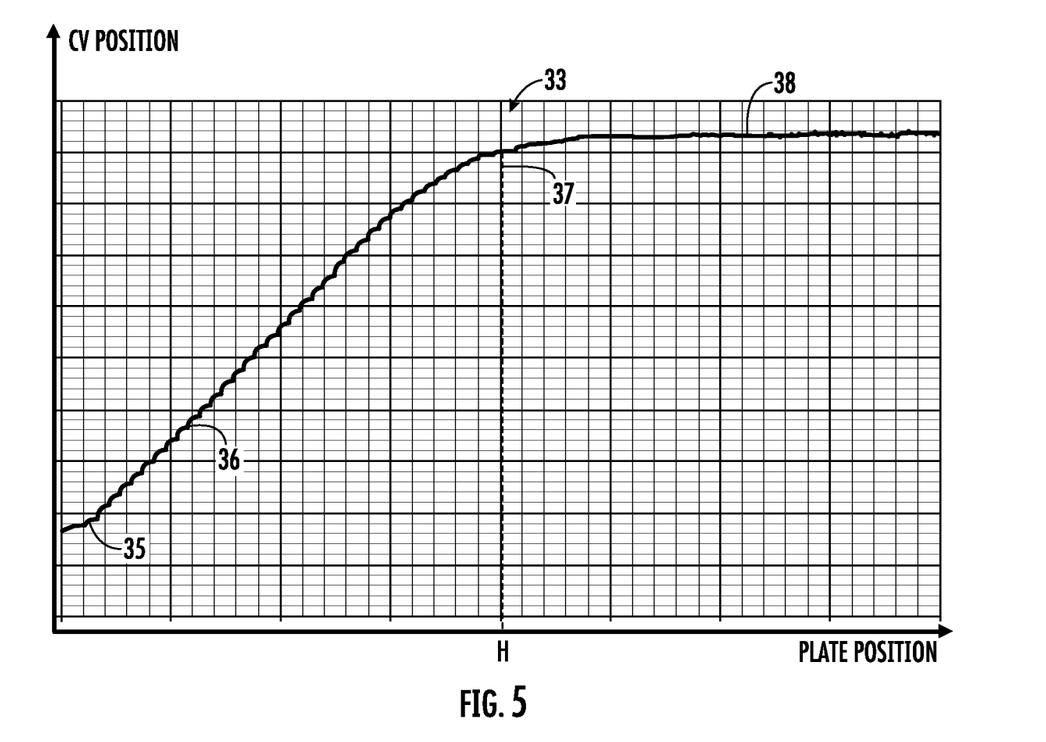
FIG. 5 is a graph of data captured from a compensation volume position sensor as a build plate is lowered incrementally into a resin vessel.
Figure 6:
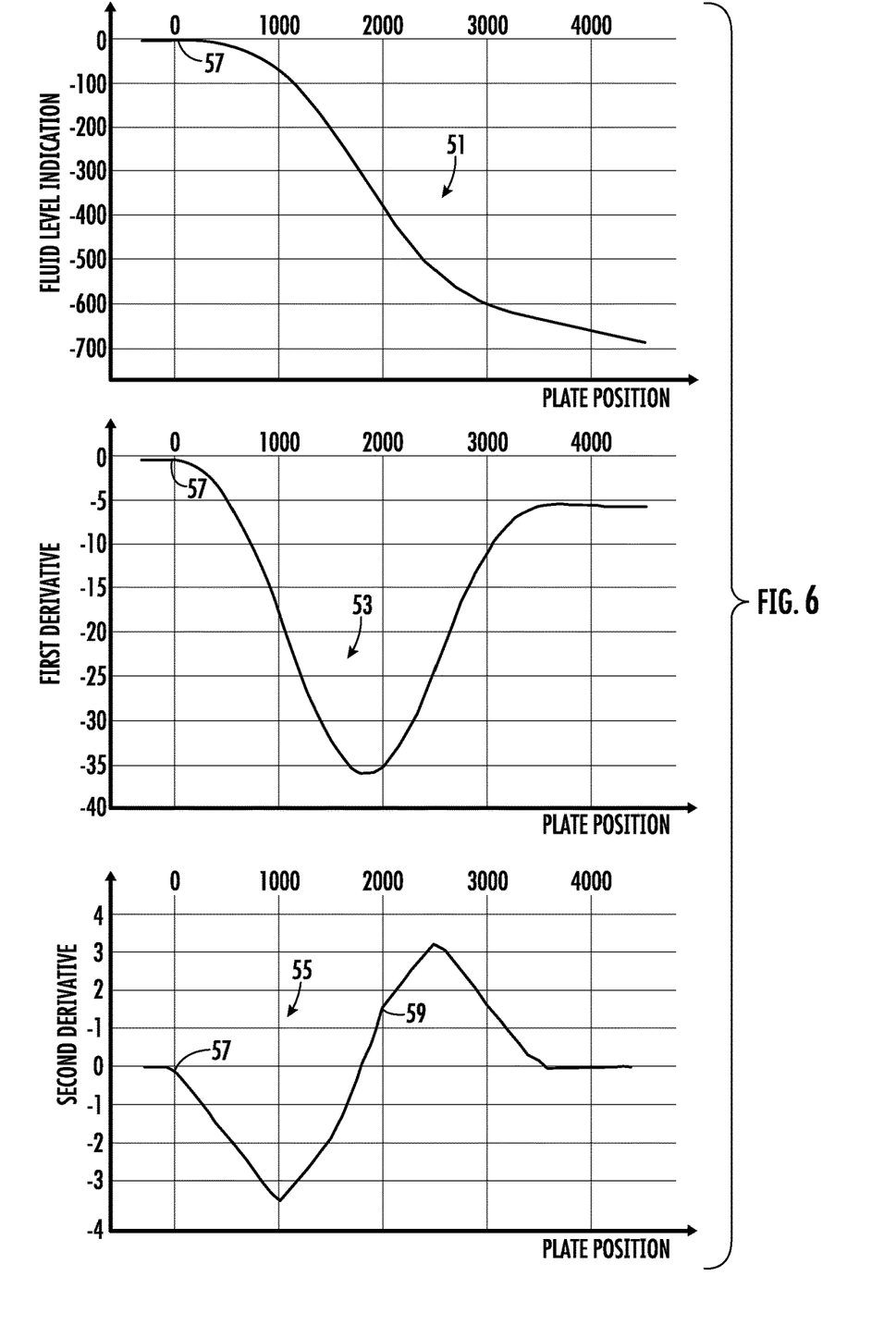
FIG. 6 is a set of three curves including a top, middle, and bottom curve. The top curve is a graph of a fluid level indication versus a build plate position for a build plate that is tipped corner to corner. The middle curve is the first derivative of the top curve. The bottom curve is the second derivative of the top curve. In these graphs, the build plate is being raised up out of the resin.

In the description that follows, the controller 18 does the following: (1A) operates the build plate positioner 14 to translate the build plate upper surface 26 between a state of immersion in the resin 7 and a state of non-immersion, (1B) concurrent with the translation of the build plate upper surface 26, capturing a signal from a sensor that is indicative of a vertical position of the resin upper surface 9 (or CV 20), (2) analyze the signal to determine one or more geometric factors, and (3) take further action. The translation motion in (1B) can be either up or down—from immersion to non-immersion or from non-immersion to immersion. To enhance the quality of the result, the signal can be analyzed for both up and down motion. In addition, the planarizing module 9 can be utilized to improve the result. FIGS. 2-5 illustrate signals captured during down motion from non-immersion to immersion and FIG. 6 illustrates a signal and some signal analysis for up motion from immersion to non-immersion. In the description that follows, it may be assumed that the signal in (1B) indicates a vertical position of the resin upper surface 9 during which the VC 10 is not operational. That said, similar methods can be used by monitoring the vertical position of the CV 20 when the VC 10 is operational.

Figure 2A:
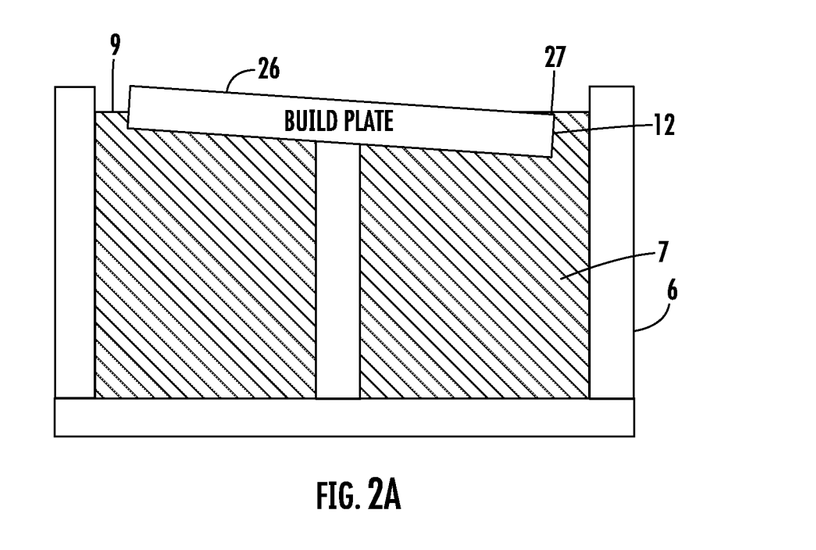
FIG. 2A is a side view schematic diagram illustrating an embodiment of a resin tank filled with resin and having a build plate tilted at an oblique angle with respect to a horizontal or vertical axis.

FIG. 2A is a side view schematic of a portion of system 2 illustrating a build plate 12 that is partially immersed in the resin 7 within the resin vessel 6. As illustrated, the build plate upper surface 26 is inclined at an oblique angle with respect to a horizontal lateral axis X or Y. In the illustration, the lowest point 27 of the build plate upper surface 26 is shown at the same vertical position as the resin upper surface 9. As the build plate upper surface 26 is slowly lowered into the resin 7, the resin upper surface 9 will rise roughly in proportion to the amount of resin 7 displaced by the build plate 12 (assuming no action of a VC 10). But when the entire build plate upper surface 26 is immersed, the resin upper surface 9 will no longer rise as the build plate 12 is lowered. This is illustrated in FIG. 2B.

Figure 2B:
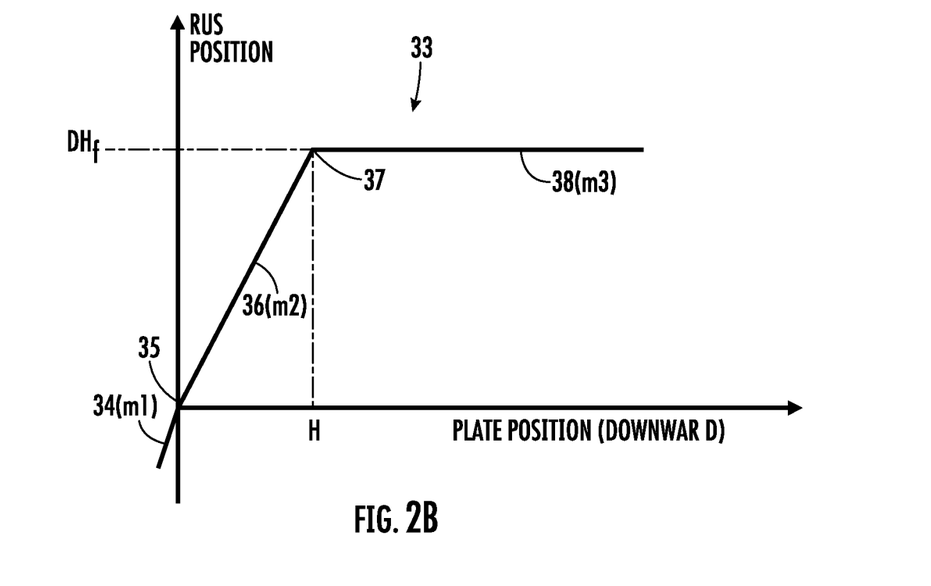
FIG. 2B is an "idealized" graph of a fluid level indication versus a vertical position of the build plate 12 of FIG. 2A as the build plate 12 is lowered into the resin.

FIG. 2B is an "idealized" graph of a fluid level indication versus a vertical position of the build plate 12 of FIG. 2A as the build plate 12 is lowered into the resin 7. For a system without an operational VC 10, the vertical axis represents a vertical position of the resin upper surface 9. When a VC 10 operates, the resin upper surface 9 stays fixed but the CV 20 rises to maintain a constant height for the resin upper surface 9. Therefore, the vertical axis of FIG. 2B can represent a vertical position of the resin upper surface 9 (for no volume compensation) or a vertical position of the CV 20 (with volume compensation). The curve 33 represents the fluid level indication versus plate 12 position as the build plate is lowered from the illustrated position.

Initially the build plate upper surface 26 is lowered from above the resin upper surface 9. The vertical position of the resin upper surface 9 changes with a first slope m1 during a first portion 34 of the curve 33 (left of the origin). As the build plate upper surface 26 continues to be lowered, the lowest point 27 of the build plate upper surface 26 reaches the resin upper surface 9 at the origin 35 of the graph. This position of the build plate 12 will be a starting point for hardening layers of the resin 7.

As the lowest point 27 is further lowered below the resin upper surface 9, the resin upper surface 9 rises at a different rate versus vertical position of the build plate 12 as indicated by a second portion 36 of the curve 33 having a slope m2, in which m2 is not equal to m1. The change in slope enables the identification of the origin 35.

A point 37 on the curve represents a threshold of complete immersion for the build plate upper surface 26 under the resin upper surface 9. With further immersion, a third portion of the curve 38 has a lesser slope (illustrated as zero in this figure). In summary for curve 33, the first portion 34 has slope m1, the second portion 36 has slope m2, and the third portion has slope m3.

In the illustration, the position on the horizontal axis that connects the second portion 36 to the third portion 38 of the curve 33 is H. The value H represents a degree of non-planarity of the build plate upper surface 26. The value H typically represents a minimum thickness of base layers required to planarize the build plate upper surface 26. If a single layer has a thickness t, then the number N of layers required for planarization generally equals H divided by t or H/t. After N base layers are formed onto the build plate upper surface 26, then formation of the article 4 can begin.

In the illustration, the fluid level indication rises by a height of $DH_f$ (differential height of fluid) as the build plate upper surface 26 is being immersed. The height $DH_f$ is generally proportional to a volume of resin 7 displaced by during the second portion 36 of the curve. An area of the build plate upper surface 26 is generally proportional to a constant times $DH_f$ divided by H if the non-planarity is strictly a tilt (this is very approximate). Such a computation allows an approximation of the size of the build plate 12 to be ascertained.

Figure 3A:
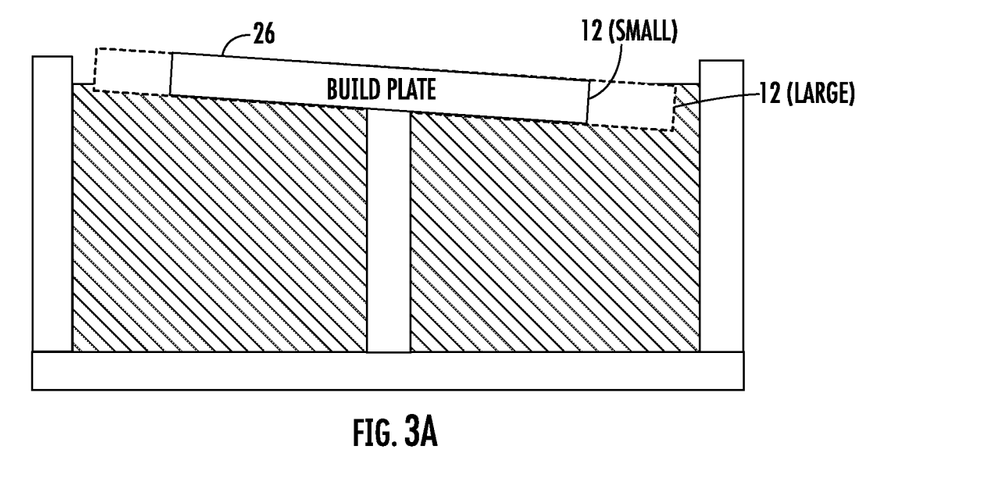
FIG. 3A is a side view schematic diagram illustrating an embodiment of a resin tank filled with resin and having alternatively a small (solid line) or large (dotted line) build plate.
Figure 3B:
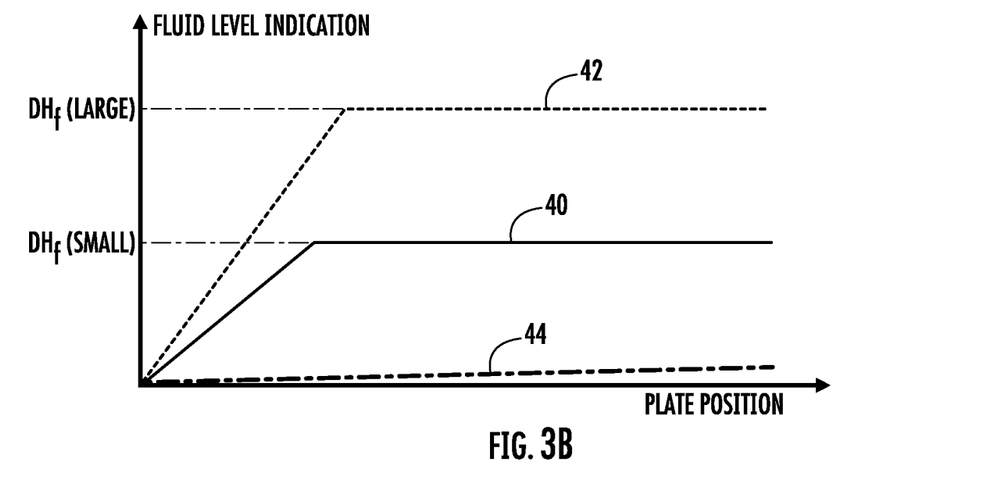
FIG. 3B is an "idealized" graph of a fluid level indication versus a vertical position of the build plate as the build plate is lowered into the resin. The top dotted line curve of the graph corresponds to the larger build plate of FIG. 3A. The middle solid line curve of the graph corresponds to the smaller build plate of FIG. 3A. The bottom dashed line curve of the graph corresponds to a missing build plate.

FIG. 3A is similar to FIG. 2A except that it depicts a smaller (solid line) and larger (dotted line) build plate 12. FIG. 3B depicts a curve 40 for the smaller build plate 12, a curve 42 for the larger build plate 12, and a curve 44 for no build plate 12. As a build plate 12 increases in area, the displaced volume of resin 7 increases (thus increasing $DH_f$) and a magnitude of non-planarity would tend to increase (thus increasing H). With no build plate 12, the curve 44 would either be flat or slightly increasing.

Figure 4A:
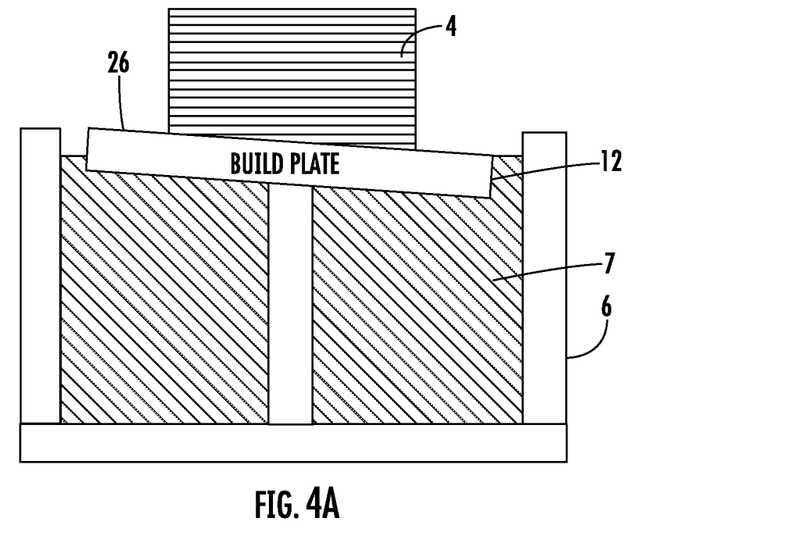
FIG. 4A is a side view schematic diagram illustrating an embodiment of a resin tank filled with resin and having a build plate with a previous build (previously fabricated 3D article and other polymer layers).

FIG. 4A is similar to FIG. 2A except that a "leftover" 3D article 4 is on the build plate upper surface 26. The resultant curve includes a first portion 46 with a slope m5 and a second portion 48 with a slope m6. Compared to FIG. 2A, the slope m6 is considerably greater than the slope m3 which indicates immersion of the 3D article 4. Finally, the last portion 50 of the curve has a slope roughly equal to m3 of FIG. 2B. From the portion 48 with slope m6 it can be inferred that the 3D article 4 is present.

Figure 4B:
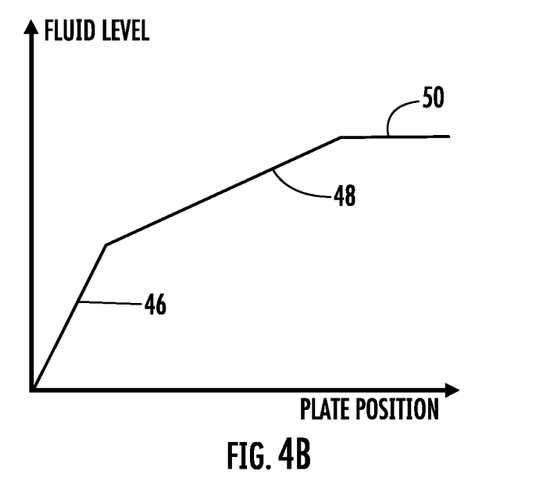
FIG. 4B is an "idealized" graph of a fluid level indication versus a vertical position of the build plate 12 of FIG. 4A as the build plate 12 is lowered into the resin.

The curves shown in FIGS. 2-4 are "idealized" in the sense that they are illustrated with linear portions. FIG. 5 captured data from a CVPS 24 as a plate is lowered. As with FIG. 2B, the illustrated curve 33 in FIG. 5 has the first portion 36 representing progressive immersion of the build plate upper surface 26 and then the second portion 38 representing post-full immersion of build plate upper surface 26. Also note that there are steps in FIG. 5; these represent lowering the build plate 12 in steps equal to a thickness of one layer of resin followed by operation of the planarizing module 9.

While FIGS. 2-5 represent a build plate upper surface 26 being lowered into the resin 7, the graphs of FIG. 6 represents a build plate 12 being raised out of the resin 7. FIG. 6 includes a set of three graphs or curves (51, 53, and 55) for a build plate 12 that is 1.5 millimeters thick and is tilted corner to corner by 2 millimeters and is being raised out of the resin 7. The top curve 51 depicts fluid level indication versus position. In this discussion, we will assume that this is a graph 51 of a vertical position of the resin upper surface 9 versus plate position as the plate is raised. As expected, the top curve 51 drops as the displaced volume of resin decreases. The top curve 51 is initially flat, but then begins to drop at a first plate position 57 as a first corner of the build plate upper surface 26 begins to rise above the resin upper surface 9. The top curve 51 is non-linear partly because of the corner to corner tilt.

A middle curve 53 is a derivative of the fluid level graph 51 versus plate position. A bottom curve 55 is a second derivative of the fluid level graph 51 versus plate position. An inflection point 59 in the bottom curve 55 is a point at which the build plate upper surface 26 is fully raised out of the resin 26. However, the thickness of the build plate 26 is still partially immersed at the inflection point 59. Detection of the inflection point 59 can be used to determine the degree of tilt (H) of the build plate upper surface 26.

In comparing FIG. 6 with the more idealized FIGS. 2-4 it can be noted that there are significant differences in the curves of fluid level indication versus build plate 12 position. Some of the differences are related to a particular design of a build plate 12. For a given build plate 12 or set of build plates, curves can be generated with known characteristics and states including flatness of the build plate upper surface 26 relative to the resin upper surface 9, different plate sizes, and leftover 3D articles. The exact time in which the high and low points of the build plate upper surface 26 are coincident with the resin upper surface 9 can be observed. These can be used to calibrate the system 2 precisely so that the build plate characteristics and states can be precisely identified based upon the curves.

Figure 7:
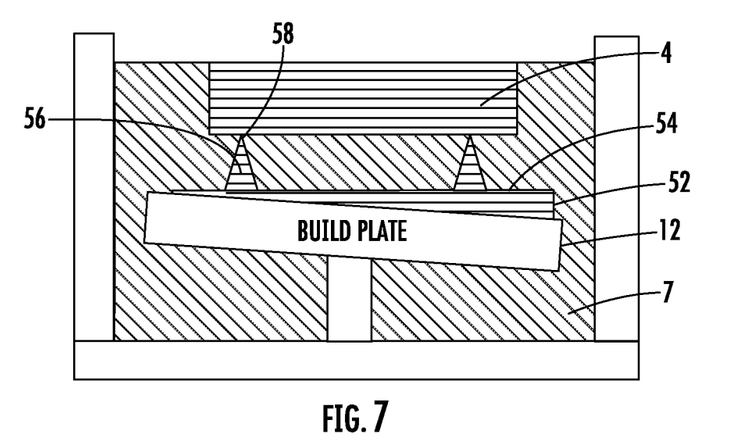
FIG. 7 is a schematic diagram of a portion of a system depicting a resin vessel filled with resin, a build plate, and polymer layers that have been selectively solidified upon an upper surface of the build plate.

FIG. 7 is a schematic diagram depicting a portion of system 2 after a selective solidification of layers of the photocurable resin 7 illustrating a process sequence. The first part of the process is a formation of base layers 52 having a thickness of H or more in order to provide a level surface 54 for forming the 3D article 4. Formed onto the base layers 52 is a scaffold 56 for supporting the 3D article 4. The scaffold 56 can be formed concurrently with the base layers 52 and/or the 3D article 4. However, the 3D article 4 is sequentially formed after the base layers 52. Between the scaffold 56 (and/or base layers 52) are frangible tips 58. The frangible tips 58 are narrowed and can be selectively broken between the scaffold 56 and the 3D article 4 with a minimal impact on surfaces of the 3D article 4 that adjoin the scaffold 56. Breaking the frangible tips 58 separates the usable 3D article 4 (the product of the manufacturing process) from the discardable or recyclable base layers 52.

Figure 8:
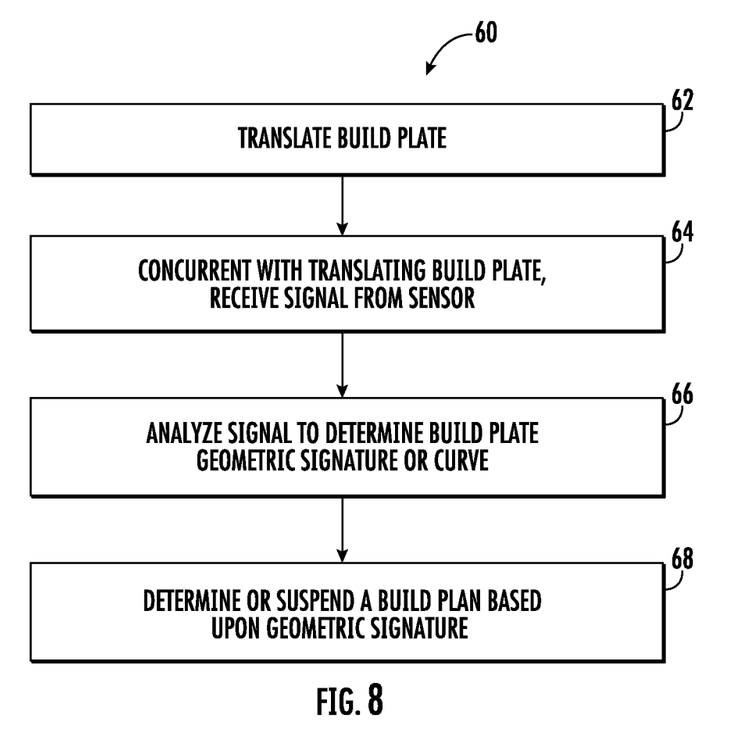
FIG. 8 is a flowchart depicting certain steps of a method for manufacturing a 3D article 4. More specifically, the illustrated method is for determining or modifying a build plan based upon an analysis performed as a result of vertically translating a build plate into and/or out of resin before selectively hardening any polymer layers.

FIG. 8 is a flowchart depicting certain steps of a method 60 for manufacturing the 3D article 4 performed by controller 18. More specifically, method 60 is a method for determining or modifying a build plan based upon an analysis performed as a result of vertically translating the build plate 12 into and/or out of resin 7 before selectively hardening any polymer layers.

According to 62, the build plate 12 is vertically translated during which the build plate upper surface 26 is moved into or out of a state of complete immersion in resin 7. According to 64, the controller receives a signal that is indicative of a fluid level indication either from sensor 8 or sensor 24. The signal may define a curve or signature as depicted in one or more of FIGS. 2-6. According to 66, the controller 18 analyzes the signal and then determines the geometric signature. The geometric signature or curve can define one or more of build plate presence (whether a build plate is loaded into system 2), a build plate size (FIGS. 3A, 3B), presence of a previous build (FIGS. 4A, 4B), H (FIG. 2A, 2B), and the vertical positions of the highest and lowest points on the build plate upper surface 26.

According to 68, the controller determines or suspends a build plan based upon the geometric signature. If the geometric signature indicates that the build plate 12 is missing or the wrong size, then the build plan can be suspended. Based upon a determination of the lowest point of the build plate upper surface 26, fabrication of base layers 52 can begin with the lowest point positioned at the resin upper surface 9. Based upon H, a number N of base layers 52 can be determined before fabrication of the 3D article 4 begins.

Figure 9:
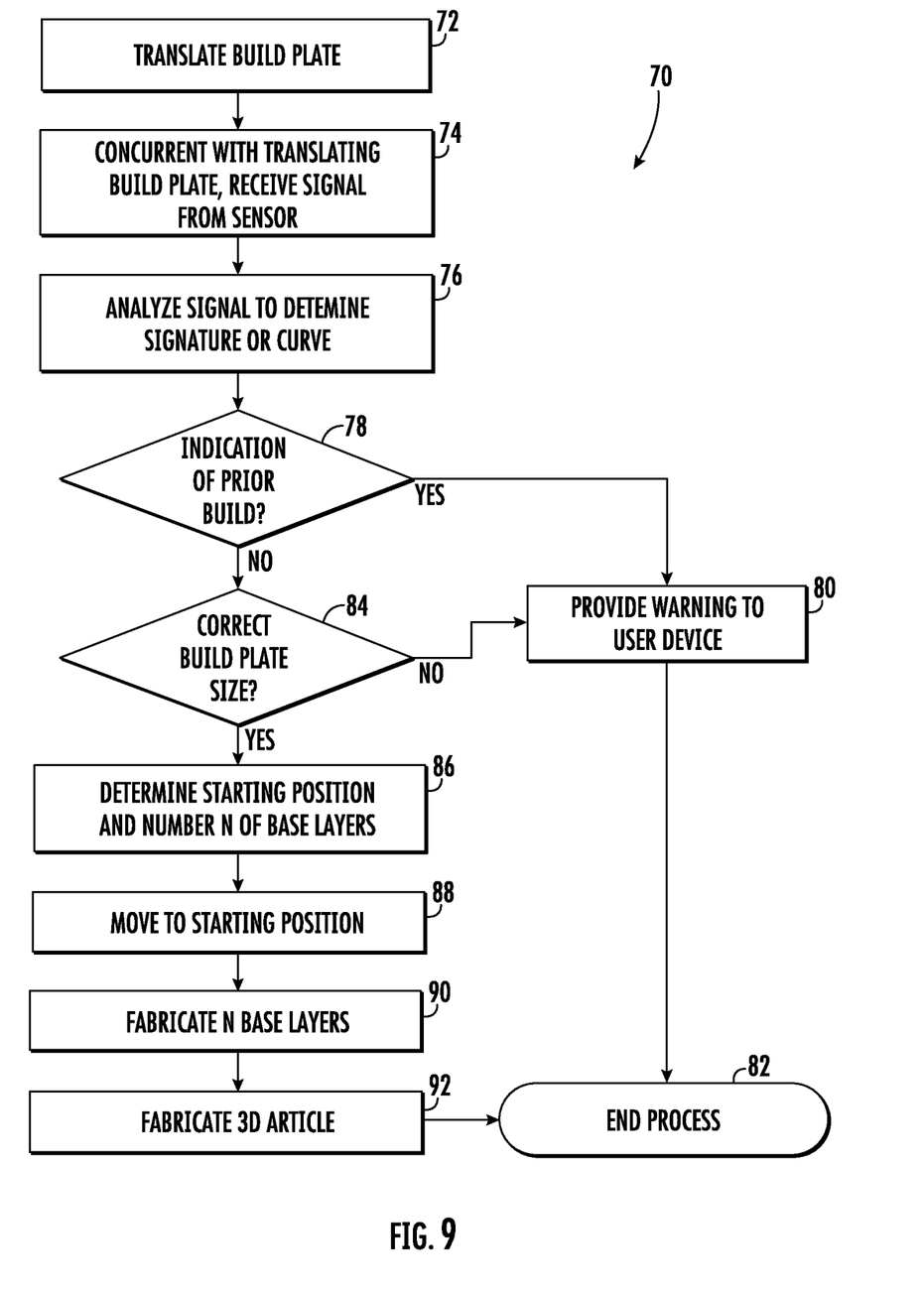
FIG. 9 is a flowchart depicting an embodiment of a method of manufacturing a 3D article.

FIG. 9 is a flowchart depicting an embodiment of a method 70 of manufacturing a 3D article 4. In an illustrative embodiment, controller 18 is configured to perform method 70. According to 72, the controller 18 operates build plate positioner 14 to translate the build plate upper surface 26 into or out of the resin 7. According to 74, the controller receives a signal from sensor 8 or 24.

According to 76, the signal is analyzed to determine a signature or fluid level indication versus vertical build plate 12 position curve such as is illustrated in FIGS. 2-6. Also, according to 76, the signature is further analyzed. This includes determining various curve parameters that correspond to various geometric features of the build plate 12 as will be made more clear in the following steps.

According to 78, the curve signature is analyzed to determine if a prior build of a 3D article 4 is still present upon the build plate upper surface 26. This has been discussed with respect to FIGS. 4A and 4B. If the prior build is present, then the process passes to step 80 at which a warning is provided to a user device and then step 82 at which the build process ends.

If the prior build is not present, then the process passes to step 84 at which a determination is made as to whether the build plate 12 size is correct. This has been discussed with respect to FIGS. 3A and 3B. If the build plate 12 is missing or of the wrong size, then the process passes to steps 80 and 82.

If the build plate 12 is the correct size and has no prior build, then the process 70 passes to step 86. At step 86 the controller 18 determines a starting vertical position for the build plate 12 and a number N of base layers.

The starting vertical position can be determined by a change in slope or inflection point of a curve as a lowest point of the build plate upper surface 26 is vertically coincident with the resin upper surface 9. This is illustrated as point 35 in FIG. 2B or point 35 in FIG. 5 or point 57 in FIG. 6.

The number N for base layers is determined by a vertical height difference H between the starting vertical position and a vertical position at which there is another change in slope or inflection point in the curve that corresponds to the highest point of the build plate upper surface 26. This is illustrated in FIG. 2B as a difference H in height between points 37 and 35. The number N is generally equal to at least H divided by a thickness t of one solidified layer of resin. However, it may desirable for N to be greater than N divided by t to assure horizontal planarity of the level surface 54.

According to 88, the controller 18 operates the build plate positioner 14 to vertically translate the build plate 12 to the starting position at which the lowest point of the build plate upper surface 26 coincides with the resin upper surface 9. According to 90, the controller 18 operates the build plate positioner 14, the planarizing module 9, and the imaging system 16 to fabricate the N base layers 52 to provide the level surface 54. According to 92, the controller 18 operates the build plate positioner 14, the planarizing module 9, and the imaging system 16 to fabricate the 3D article 4.

The specific embodiments and applications thereof described above are for illustrative purposes only and do not preclude modifications and variations encompassed by the scope of the following claims.

What is claimed:

1. A three-dimensional (3D) printing system for manufacturing a three-dimensional (3D) article comprising:
a resin vessel for containing a volume of photocurable resin having a resin upper surface;
an imaging system configured to define a build plane;
a build plate having a build plate upper surface that is inclined at an oblique angle with respect to a lateral axis and the oblique angle is proportional to a height H which exists between a lowest point and a highest point over a build area over which the 3D article is to be fabricated over the build plate upper surface;
a build plate positioner;
a sensor configured to generate a signal indicative of a fluid-related vertical position of one or more of the resin upper surface and a component of a volume compensator (VC);
a controller configured to:
operate the build plate positioner to vertically translate the build plate upper surface from a state of non-immersion to a state of immersion and/or from a state of immersion to a state of non-immersion;
concurrent with operating the build plate positioner, receiving the signal from the sensor, the signal indicative of a fluid level vertical deflection that increases with the oblique angle and the height H;
analyze the signal to determine the height H; and
form a plurality of base layers having a cumulative thickness at least equal to the height H before beginning to form layers of the 3D article.

2. The three-dimensional (3D) printing system of claim 1 wherein the analyzing the signal defines a curve, the curve having a change in slope or inflection point at a first vertical position of the build plate at which a low point of the build plate upper surface is positioned at the resin upper surface, formation of the plurality of base layers begins at the first vertical position of the build plate.

3. The three-dimensional (3D) printing system of claim 1 wherein the analyzing the signal defines a curve, the curve having a change in slope or inflection point that defines the height H and a number N of the plurality of base layers to fabricate before fabricating the 3D article.

4. The three-dimensional (3D) printing system of claim 3 wherein the number N of base layers fabricated before fabrication of the 3D article is equal to the height H divided by a thickness t of one base layer plus a predetermined number of additional layers.

5. The three-dimensional (3D) printing system of claim 1 wherein the analyzing the signal defines a curve, the curve is a first or second derivative of a function of fluid-related vertical position versus a build plate position, the curve is analyzed to determine a lowest or highest vertical position of the build plate upper surface.

6. The three-dimensional (3D) printing system of claim 1 wherein the analyzing the signal defines a curve and a determination of whether a previously fabricated article is present upon the build plate upper surface.

7. A method of manufacturing a three-dimensional (3D) article comprising:
providing a three dimensional printing system including:
a resin vessel for containing a volume of photocurable resin having a resin upper surface;
an imaging system configured to define a build plane;
a build plate having a build plate upper surface that is inclined at an oblique angle with respect to a lateral axis and the oblique angle is proportional to a height H which exists between a lowest point and a highest point over a build area over which the 3D article is to be fabricated over the build plate upper surface;
a build plate positioner;
a sensor configured to generate a signal indicative of a fluid-related vertical position of one or more of the resin upper surface and a component of a volume compensator (VC); and a controller and;
operating the controller to:
operate the build plate positioner to vertically translate the build plate upper surface from a state of non-immersion to a state of immersion and/or from a state of immersion to a state of non-immersion;
concurrent with operating the build plate positioner, receiving the signal from the sensor, the signal indicative of a fluid level vertical deflection that increases with the oblique angle and the height H;
analyze the signal to determine the height H a build plate geometric signature; and
form a plurality of base layers having a cumulative thickness at least equal to the height H before beginning to form layers of the 3D article.

8. The method of claim 7 wherein the analyzing the signal defines a curve, the curve having a change in slope or inflection point at a first vertical position of the build plate at which a low point of the build plate upper surface is positioned at the resin upper surface, formation of the plurality of base layers begins at the first vertical position of the build plate.

9. The method of claim 7 wherein the analyzing the signal defines a curve, the curve having a change in slope or inflection point that defines the height H and a number N of the plurality of base layers to fabricate before fabricating the 3D article.

10. The method of claim 9 wherein the number N of base layers fabricated before fabrication of the 3D article is equal to the height H divided by a thickness t of one base layer plus a predetermined number of additional layers.

11. The method of claim 7 wherein the analyzing the signal defines a curve, the curve is a first or second derivative of a function of fluid-related vertical position versus a build plate position, the curve is analyzed to determine a lowest or highest vertical position of the build plate upper surface.

12. The method of claim 7 wherein the analyzing the signal defines a curve and a determination of whether a previously fabricated article is present upon the build plate upper surface.

13. A non-transient storage media storing software instructions, when executed by a processor, the software instructions control portions of a three-dimensional printing system, the three dimensional printing system including a resin vessel for containing a volume of photocurable resin having a resin upper surface, an imaging system configured to define a build plane, a build plate having a build plate upper surface that is inclined at an oblique angle with respect to a lateral axis and the oblique angle is proportional to a height H which exists between a lowest point and a highest point over a build area over which the 3D article is to be fabricated over the build plate upper surface, a build plate positioner, and a sensor configured to generate a signal indicative of a fluid-related vertical position of one or more of the resin upper surface and a component of a volume compensator (VC), when executed by the processor the software instructions perform at least the following steps:

operate the build plate positioner to vertically translate the build plate upper surface from a state of non-immersion to a state of immersion and/or from a state of immersion to a state of non-immersion;

concurrent with operating the build plate positioner, receiving the signal from the sensor, the signal indicative of a fluid level vertical deflection that increases with the oblique angle and the height H;

analyze the signal to determine the height H; and form a plurality of base layers having a cumulative thickness at least equal to the height H before beginning to form layers of the 3D article.

14. The non-transient storage media of claim 13 wherein the analyzing the signal defines a curve, the curve having a change in slope or inflection point at a first vertical position of the build plate at which a low point of the build plate upper surface is positioned at the resin upper surface, formation of the plurality of base layers begins at the first vertical position of the build plate.

15. The non-transient storage media of claim 13 wherein the analyzing the signal defines a curve, the curve having a change in slope or inflection point that defines the height H and a number N of the plurality of base layers to fabricate before fabricating the 3D article.

16. The non-transient storage media of claim 15 wherein the number N of base layers fabricated before fabrication of the 3D article is equal to the height H divided by a thickness t of one base layer plus a predetermined number of additional layers.

17. The non-transient storage media of claim 13 wherein the analyzing the signal defines a curve, the curve is a first or second derivative of a function of fluid-related vertical position versus a build plate position, the curve is analyzed to determine a lowest or highest vertical position of the build plate upper surface.

18. The non-transient storage media of claim 13 wherein the analyzing the signal defines a curve and a determination of whether a previously fabricated article is present upon the build plate upper surface.

\* \* \* \* \*